L. Anderson,

Reciprocating Saw Mill.

No. 1,733. Reissued Aug. 2, 1864.

Witnesses:
H Holcomb
J. F. Single

Inventor:
Leonard Anderson

AM. PHOTO-LITHO. CO. N.Y. (OSBORNE'S PROCESS)

UNITED STATES PATENT OFFICE.

LEONARD ANDERSON, OF PAINESVILLE, OHIO.

IMPROVED METHOD OF HANGING RECIPROCATING SAWS.

Specification forming part of Letters Patent No. 26,823, dated January 17, 1860; Reissue No. 1,733, dated August 2, 1864.

*To all whom it may concern:*

Be it known that I, LEONARD ANDERSON, of Painesville, in the county of Lake and State of Ohio, have invented a new and useful Improvement in Hanging Reciprocating Saws; and I do hereby declare that the following is a full, clear, and exact description thereof, reference being had to the accompanying drawings, and to the letters of reference marked thereon, of which—

Figure 1:
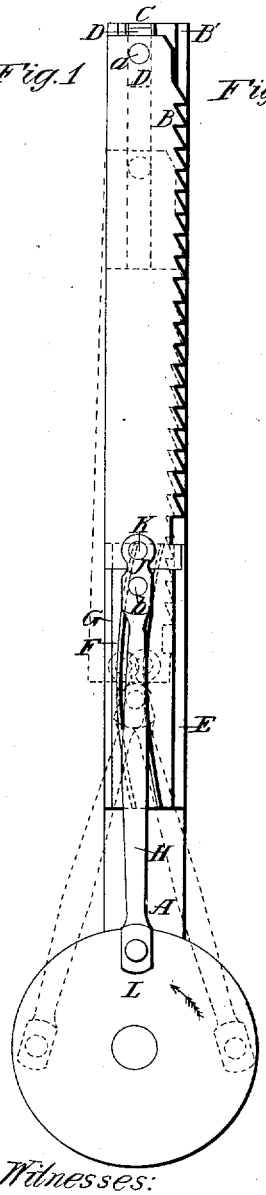
Figure 2:
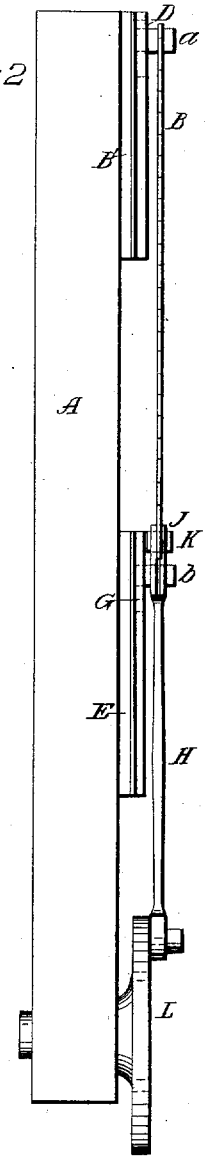
Figure 3:
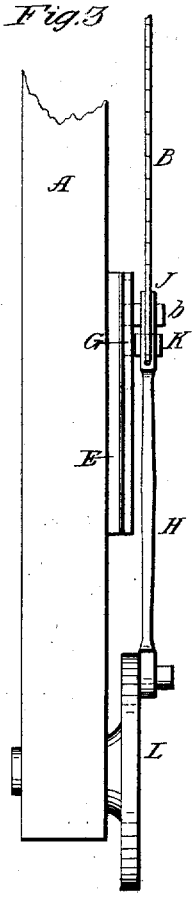
Figure 4:
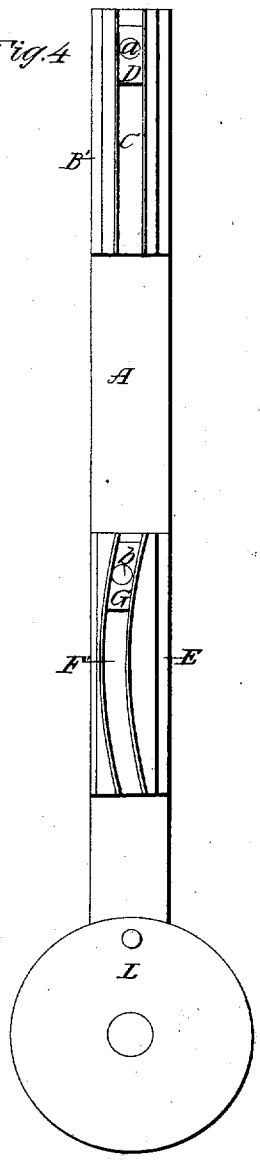

Figure 1 is a side view representing my mode of hanging the saw, showing it in its two positions. Figs. 2 and 3 are front views of the same showing two equivalent modes of connecting the saw with the pitman with respect to its fulcrum. Fig. 4 is a similar view to Fig. 1 with the saw and pitman removed.

Similar letters of reference indicate like parts in all the figures.

The nature of my invention consists in hanging or pivoting a reciprocating saw to the pitman at a distance from its bearings or fulcrum, either above or below its said fulcrum, by which arrangement the saw, when on its return or upward stroke, is caused to recede outward after each downstroke, respectively, and in the employment of curved slides or guides by which the saw, when so hung as aforesaid, is made to descend in a direct or vertical line by the compensating nature of the said curve, so that all of its teeth are made to cut direct. The advantages gained by this arrangement will be fully set forth hereinafter.

The description of parts and the operation thereof are embodied in the following details.

A represents the saw-frame, and B the saw. At the upper end of the frame is a block, B′, having a vertical sliding groove, C, in which works a slide-block, D. To this block the saw is pivoted, at *a*. The lower end of the frame has a similar block, E, fixed to it, but this block has a curved sliding groove, F′, in which works a slide-block, G. This slide block G receives and supports the fulcrum-pin *b* of the pitman H, to which the saw B is connected by the pin K. The saw is thus hung independent of the slide-block G, its (the saw's) lower end being carried and controlled by what I term the "short arm" of the pitman, and marked J. This short arm arises in consequence of locating the connection of the saw at a distance from the fulcrum of the pitman. The connection is indicated by the pin K. The pitman H is operated by a crank-wheel, L.

The action upon the saw by the above-described arrangement is to throw the saw back during its upward movement, because the upper end of the pitman H turns as the saw rises upon its fulcrum-pin *b* and throws the short arm J backward, thus carrying the lower end of the saw back away from the log. The sweep of the curved slide F′ and the length of the short arm J correspond or are equal, so that the said short arm will carry the saw back to a distance equal to the sweep of the said curved slide. The full backward movement of the saw is reached when the fulcrum-pin *b* has arrived at the middle of the curved slide F′. When the fulcrum-pin has so reached the middle of the curved slide, the pitman begins to turn in a contrary direction on its said fulcrum, so as to carry the short arm J forward, and with it the lower part of the saw, and by the time the pitman has reached the end of its upward stroke, the bottom part of the saw will have been carried so far forward that the cutting-edge stands in a vertical line. This vertical line is maintained during the whole descent of the saw, because the upper end of the pitman continues to turn forward on its fulcrum-pin *b*, and this carries forward the short arm J, and lower part of the saw just as much and just as fast as the slide-block G by following the sweep of the curved slide F′ carries back the fulcrum-pin *b* of the pitman in descending.

When the fulcrum-pin *b* in its descent passes the middle of the curved slide F′, the said fulcrum-pin, following the sweep of the curved slide, begins to be carried forward; but at the same time the pitman turns in the contrary direction on its fulcrum, carrying with it the short arm J, so that the tendency of the fulcrum-pin *b* to carry the short arm J and saw forward during the last half of the stroke is neutralized or met by the swinging of the pitman on its fulcrum-pin *b*. The swinging of the pitman on its fulcrum-pin *b* is just as far and just as fast as the fulcrum-pin is carried forward by the sweep of the curved slide, so that the saw descends on a vertical line; but in ascending the lower part of the saw is carried outward from the stuff, as before described.

I do not strictly confine myself to the mode represented in Figs. 1 and 2 for connecting the saw B to the pitman H with respect to its fulcrum, as I can, if deemed necessary, attach the saw to the said pitman below its fulcrum, as represented in Fig. 3, the said fulcrum still retaining its bearing in the said slide-block G. The result, in consequence of the curved slide F′ being precisely one and the same thing, the receding back movement of the saw is still preserved, the only difference being that the crank-wheel, to which the pitman H is attached, must, as a matter of course, revolve the other way.

Among the advantages of this peculiar movement of the saw are the following: The saw cuts itself clear at every stroke, carrying the sawdust all below and throwing none of it on top of the log; never clogs in the largest log; avoids all the friction and wear consequent on a saw's rising with the back of its teeth against the log and choked with dust, which in a mill with the continuous feed or "rack and-pinion" feed consumes nearly as much power on its upward stroke as is required to do the cutting. With my mode of hanging a saw a four-foot log has been cut through with the same speed, feed, and power that mills with the ordinary mode of hanging use in cutting a log twenty inches through.

With my mode of hanging the saw it needs dressing only about one third as often as by the ordinary plan, for the teeth are subject to wear only from actual cutting, and not from being snubbed against the log on the upward stroke, so that a saw will last about three times as long.

The parts in my improvement are so constructed that there is little weight of metal, but much strength. The pitman I make from three feet eight inches to five feet long, all iron, and with cross-heads all complete only weigh from thirty-five pounds to fifty pounds, and will stand a very high speed, having run them on trial as high as four hundred and seventy-five revolutions per minute. In my improvement I use the ordinary pitman for all the purposes of a pitman connected directly to the saw; but, as before stated, I place the said connection at a distance from its bearing in its slide-block, either above or below it, thus making the said pitman a kind of lever, its fulcrum being the said bearing in the said slide-block. Now, if that fulcrum moved in a right line, as would be the case if a straight slide or guide were used, every revolution of the crank would result in a curved cutting-line forward from the vertical line of the saw, and the return-stroke would be a similar curve back from the vertical line of the saw up to its vertical position again. This was the plan originated by me while experimenting on a method to give a reciprocating saw a receding back motion in its upward stroke; but I abandoned it as useless compared with the perfect results of my present improvement. By substituting a curved slide in the place of a straight one I found that it would counteract or neutralize the tendency of the saw to cut in a curved line and make the said stroke a perfect vertical or direct line by throwing the "forward" curve all on the return-stroke. Now, the pitman thus arranged acts as a lever only so far as the receding movement is concerned.

Another advantage of my improvement is the facility with which extra large logs can be cut. For an illustration of the defects of the old method, suppose a log four feet through with a twelve-inch crank, (which is the ordinary length of saw-cranks,) the saw has two-feet stroke. Now, there are two feet of that saw which are continually in the log, and with the ordinary saw motion the saw cannot clear itself from dust; therefore the lighter feed must be put on, and sometimes the feed must be thrown off entirely to let the dust work out; but with my plan the saw makes its cut, recedes, and, leaving its dust in the kerf, then rises, strikes in again and carries the dust already made down through, thus keeping itself entirely clear, so that I can carry a fast feed and with large logs can make lumber faster than with small or medium sized logs, while other mills on large logs cannot make lumber as fast as on smaller ones. No saw that returns on its upward stroke in the same track as its downward stroke can free itself from dust.

Having thus described my invention, what I claim therein as new, and desire to secure by Letters Patent, is—

1. Locating the pin K, which connects the saw B with the pitman H, above the fulcrum-pin *b* of the said pitman, as shown in Fig. 2; or locating it below, as represented in Fig. 3, when the top of the said saw moves in slides or grooves for the purpose of imparting to the saw a receding back motion during its upward stroke, as herein set forth.

2. The employment and use of curved slides or grooves, F′, by which I am enabled to overcome or counteract the tendency of the saw, when pivoted above or below the fulcrum-pin of the pitman to move in a curved line on its downward stroke, so that by the compensating nature of the said curved slides the saw will descend in a direct or vertical line and cause all of its teeth to cut direct, as herein stated.

LEONARD ANDERSON.

Witnesses:
J. F. SINGLE,
F. ROCKWELL.